US008740394B2

(12) United States Patent
Baba

(10) Patent No.: US 8,740,394 B2
(45) Date of Patent: Jun. 3, 2014

(54) ILLUMINATION OPTICAL SYSTEM FOR A PROJECTOR APPARATUS

(71) Applicant: FUJIFILM Corporation, Tokyo (JP)

(72) Inventor: Tomoyuki Baba, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/874,676

(22) Filed: May 1, 2013

(65) Prior Publication Data

US 2013/0242272 A1    Sep. 19, 2013

Related U.S. Application Data

(63) Continuation of application No. PCT/JP2011/005868, filed on Oct. 20, 2011.

(30) Foreign Application Priority Data

Nov. 2, 2010    (JP) .................................. 2010-246479

(51) Int. Cl.
| G03B 21/28 | (2006.01) |
| G02F 1/00 | (2006.01) |
| G02B 5/08 | (2006.01) |
| G02B 7/182 | (2006.01) |
| G02B 26/08 | (2006.01) |
| G02B 26/12 | (2006.01) |

(52) U.S. Cl.
USPC ............ 353/81; 353/96; 348/771; 359/201.2; 359/850; 359/904

(58) Field of Classification Search
USPC ............... 353/81, 98; 348/771; 359/904, 838, 359/850, 201.2
See application file for complete search history.

(56) References Cited

U.S. PATENT DOCUMENTS

| 2002/0012101 A1 | 1/2002 | Takeuchi et al. |
| 2002/0180934 A1 | 12/2002 | Shimizu |
| 2003/0099008 A1* | 5/2003 | Cannon et al. ................. 359/10 |
| 2005/0023446 A1 | 2/2005 | Chang et al. |
| 2006/0266933 A1 | 11/2006 | Chang et al. |

FOREIGN PATENT DOCUMENTS

| JP | 2000-206452 | 7/2000 |
| JP | 2002-350775 | 12/2002 |
| JP | 2005-055866 | 3/2005 |
| JP | 2005-510759 | 4/2005 |

* cited by examiner

Primary Examiner — Georgia Y Epps
Assistant Examiner — Magda Cruz
(74) Attorney, Agent, or Firm — Young & Thompson

(57) ABSTRACT

In an illumination optical system for a DMD type projector, the TIR prism is configured such that a projection line, which is a normal to the total reflection surface vertically projected on the DMD surface, forms an angle other than 90° with a micromirror turning axis, an exit light projection line, which is a principal ray of light beam exits from the total reflection surface vertically projected on the DMD surface, forms an angle of 90° with the micromirror turning axis, and an incident light projection line, which is a principal ray of light beam incident on the total reflection surface vertically projected on the DMD surface, is located on the same side as the exit light projection line with respect to a straight line passing through an end point of the incident light projection line and extending parallel to a long side of the DMD.

2 Claims, 6 Drawing Sheets

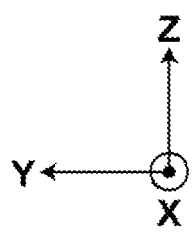
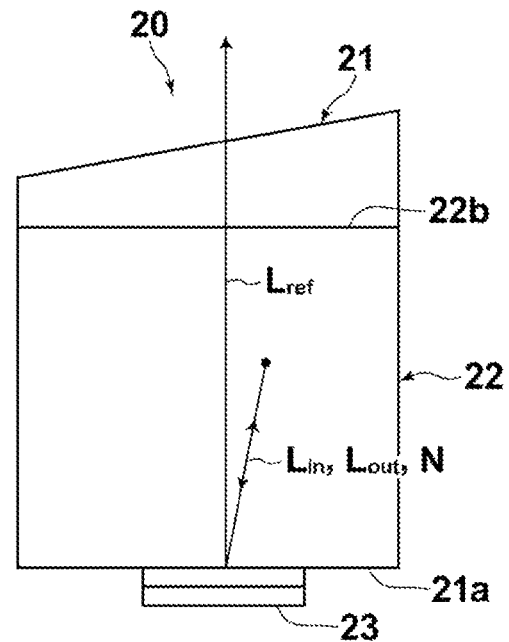
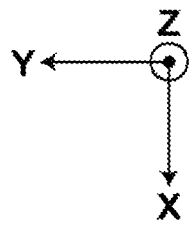
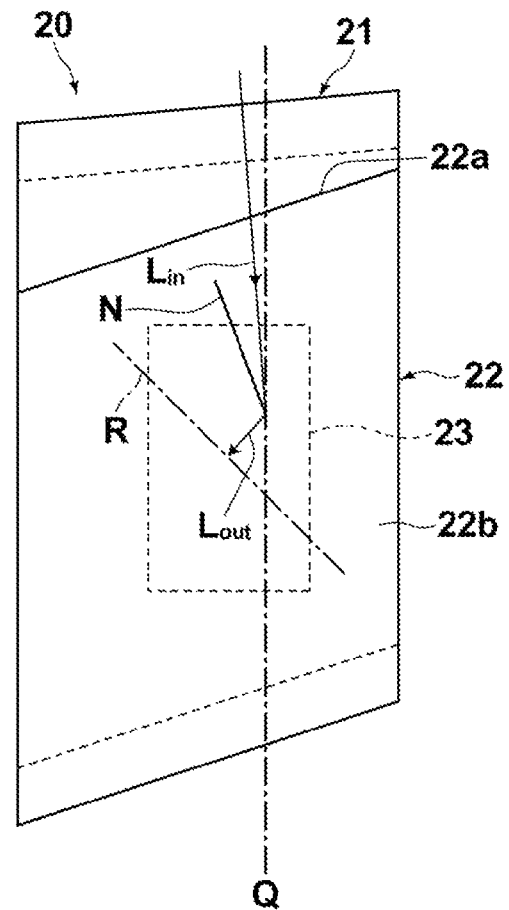

US 8,740,394 B2

ILLUMINATION OPTICAL SYSTEM FOR A PROJECTOR APPARATUS

CROSS REFERENCE TO RELATED APPLICATIONS

This application is a continuation of International Application No. PCT/JP2011/005868 filed on Oct. 20, 2011, which claims priority to Japanese Application No. 2010-246479 filed on Nov. 2, 2010. The entire contents of each of the above identified application are hereby incorporated by reference.

TECHNICAL FIELD

The present invention generally relates to a projector apparatus and more particularly to a projector apparatus in which a projection image is formed by a DMD, one of reflective light modulation devices.

The invention also relates to an illumination optical system used for such a projector apparatus.

BACKGROUND ART

A display apparatus in which an image formed by a DMD (Digital Micromirror Device, registered trade mark), one of reflective light modulation devices, is projected and displayed on a screen by a projection optical system is known as described, for example, in Japanese Unexamined Patent Publication No. 2000-206452. The DMD includes a multitude of micromirrors arranged in a matrix, in which each micromirror takes two tilted states of ON and OFF states. In a projector apparatus that employs a DMD, the projection optical system is disposed such that, when illumination light is directed to the DMD, illumination light incident on an ON state micromirror is reflected toward the inside of the projection optical system while illumination light incident on an OFF state micromirror is reflected toward the outside of the projection optical system. Consequently, only the light reflected by ON state micromirrors is projected on the screen by the projection optical system, whereby a light and dark pattern display image is formed on the screen. In this case, one micromirror represents one pixel of the display image.

An overview of a DMD will now be described with reference to FIGS. 9 and 10. FIG. 9 is a plan view of a DMD, illustrating a drive structure of the DMD, and FIG. 10 is a sectional elevation of the DMD, illustrating a cross-sectional shape of a portion along the line A-A in FIG. 9. Note that these drawings illustrate one of a multitude of micromirrors in an enlarged form, and an actual DMD includes a multitude of micromirrors arranged in a matrix.

As illustrated in the drawings, the micromirror 2 of the DMD 1 takes two tilted states of ON state in which the micromirror is tilted, for example, by +12° and OFF state in which it is tiled by −12° by turning around a turning axis R. The turning axis R is set in a direction that forms an angle of 45° with a long or short side of the DMD 1 and illumination light $L_0$ is directed to the surface of the DMD 1 from a direction orthogonal to the turning axis at an incident angle of 24° with respect to the surface of the DMD 1. The illumination light $L_0$ directed to the DMD 1 becomes a projection light $L_1$ having a reflection angle of 0° with respect to the surface of the DMD 1 when reflected by an ON state micromirror 2, while it becomes a projection light $L_2$ having a reflection angle of −48° with respect to the surface of the DMD 1 when reflected by an OFF state micromirror 2. As only the projection light $L_1$ with a reflection angle of 0° reflected by ON state micromirrors 2 enters the projection optical system, an image formed by controlling the light and dark of each micromirror 2 is projected on the screen. That is, in this case, one micromirror 2 of the DMD 1 represents one pixel of the image.

The term "surface of the DMD 1" as used herein is defined as a surface parallel to the surface that includes turning axes R of all micromirrors and traverses the surfaces of all the micromirrors 2.

In the mean time, in a projector apparatus that employs the DMD 1 as described above, it is necessary to configure the illumination optical system to satisfy two conditions: directing the illumination light $L_0$ from a direction orthogonal to the turning axis R of the micromirror 2, i.e., from a direction that forms an angle of 45° with a long or short side of the DMD 1 and directing the illumination light $L_0$ to the surface of the DMD 1 at an incident angle of 24° due to structural reasons of the DMD 1.

Consequently, in conventional projector apparatuses, an illumination optical system that uses a TIR prism (Total Internal Reflection Prism) to guide illumination light to the DMD 1, as illustrated in FIGS. 11 and 12, is frequently used. That is, the light emitted from the light source 3 is collected by the rod integrator 5 through the color wheel 4 and guided by the first mirror 6 and the second mirror 7 to the TIR prism 8 where the light is totally reflected, thereby directing the light from a predetermined direction (direction orthogonal to the turning axis of micromirror) to the DMD 1 at a predetermined incident angle (24° with respect to the surface of the DMD 1). Then, the illumination light directed in the manner described above is reflected by DMD 1 to perform light modulation and light transmitted through the TIR prism 8 after the light modulation is projected on a screen by the projection optical system 9.

An example TIR prism 8 used in a conventional projector apparatus will now be described in detail with reference to FIGS. 6, 7, and 8 which illustrate the perspective shape, lateral shape, and bottom shape respectively. Note that, in FIGS. 6 to 8, a long side direction and a short side direction of the DMD 1 are designated as X direction and Y direction respectively and a direction orthogonal to X and Y directions is designated as Z direction. As illustrated in FIGS. 6 to 8, the TIR prism 8 includes a first prism 8A and a second prism 8B, and totally reflects illumination light $L_{in}$ guided from an optical system (not shown) at a total reflection surface P to direct totally reflected illumination light $L_{out}$ from a predetermined direction and at a predetermined angle with respect to the DMD 1. The TIR prism 8 also transmits reflection light $L_{ref}$ from the DMD 1 through the total reflection surface P of the first prism 8A and outputs from the second prism 8B, thereby guiding the light $L_{ref}$ to the projection optical system.

For that purpose, in the TIR prism 8, an inclination angle α of the total reflection surface P is set so as to totally reflect the incident illumination light $L_{in}$ and transmit the reflection light $L_{ref}$ from the DMD 1, and the direction of the total reflection surface P is set such that a projection line, which is a normal N to the total reflection surface projected on a surface, including the surface of the DMD 1, forms an angle of 90° with the micromirror turning axis R of the DMD 1 (FIGS. 7 and 8). Then, the illumination light is directed to the TIR prism 8 such that a projection line which is a travelling direction of the incident illumination light $L_{in}$ and exit (reflection) illumination light $L_{out}$ with respect to the total reflection surface P projected on a surface, including the surface of the DMD 1, forms an angle of 90° with the micromirror turning axis R of the DMD 1, as in the normal N to the total reflection surface.

In a conventional projector apparatus having the aforementioned DMD and TIR prism, however, there has been no choice but to use a thick prism as the TIR prism, as clearly indicated in FIG. 8, thereby causing a problem that the projector apparatus becomes thick as the consequence.

In view of the circumstances described above, the present inventor has already proposed a projector apparatus that may use a thin TIR prism in Japanese Unexamined Patent Publication No. 2002-350775. This projector apparatus is a projector apparatus in which light from a light source is guided to a TIR prism, light totally reflected by the TIR prism is reflected by a DMD to perform light modulation, and light transmitted through the TIR prism after the light modulation is projected on a screen by a projection optical system, wherein: the TIR prism has a total reflection surface for totally reflecting and guiding illumination light to the DMD and transmitting light modulated by the DMD, and is disposed such that a projection line, which is a normal vector to the total reflection surface viewed from a direction perpendicular to the surface of the DMD, forms an angle of less than 45° with a long or short side of the DMD, i.e., forms an angle of less than 90° with a micromirror turning axis of the DMD; and the illumination optical system causes the illumination light to be incident on the total reflection surface such that a projection line, which is an optical axis of the illumination light exits from the TIR prism to the DMD viewed from a direction perpendicular to the surface of the DMD, forms an angle of 45° with a long or short side of the DMD.

DISCLOSURE OF THE INVENTION

The projector apparatus described in Japanese Unexamined Patent Publication No. 2002-350775 has achieved an intended objective, but the present invention intends to provide a further thinner projector apparatus and an illumination optical system that allows the realization of such a projector apparatus.

An illumination optical system for use with a projector apparatus according to the present invention is an illumination optical system for use with a projector apparatus in which light emitted from a light source is guided to a TIR prism, light totally reflected by a total reflection surface of the TIR prism is reflected by a DMD having a rectangular surface to perform light modulation, and light transmitted through the total reflection surface after the light modulation is projected on a screen by a projection optical system, wherein:

the DMD is disposed such that the rectangular surface of the DMD is parallel to one end face of the TIR prism from which the totally reflected light exits; and the TIR prism is configured such that a projection line, which is a normal to the total reflection surface vertically projected on the surface of the DMD, forms an angle other than 90° with a micromirror turning axis of the DMD, an exit light projection line, which is a principal ray of light beam exits from the total reflection surface vertically projected on the surface of the DMD, forms an angle of 90° with the micromirror turning axis, and an incident light projection line, which is a principal ray of light beam incident on the total reflection surface vertically projected on the surface of the DMD, is located on the same side as the exit light projection line with respect to a straight line passing through an end point of the incident light projection line and extending parallel to a long side of the DMD.

A projector apparatus according to the present invention is a projector apparatus having the illumination optical system of the present invention described above.

In the illumination optical system of the present invention, the TIR prism is configured such that a projection line, which is a normal to the total reflection surface vertically projected on the surface of the DMD, forms an angle other than 90° with a micromirror turning axis of the DMD (which corresponds to that the projection line forms an angle smaller than 45° with a long or short side of the DMD in the projector apparatus described in Japanese Unexamined Patent Publication No. 2002-350775) and an exit light projection line, which is a principal ray of light beam exits from the total reflection surface vertically projected on the surface of the DMD, forms an angle of 90° with the micromirror turning axis (which corresponds to that the projection line forms an angle of 45° with a long or short side of the DMD in the projector apparatus described in Japanese Unexamined Patent Publication No 2002-350775, and which is a necessary condition for normal use of the DMD). This allows the entire optical system to be formed thinly, basically as in the projector apparatus described in Japanese Unexamined Patent Publication No. 2002-350775.

In addition, in the illumination optical system of the present invention, the TIR prism is further configured such that an incident light projection line, which is a principal ray of light beam incident on the total reflection surface vertically projected on the surface of the DMD, is located on the same side as the exit light projection line with respect to a straight line passing through an end point of the incident light projection line (i.e., incident point of the principal ray on the total reflection surface) and extending parallel to a long side of the DMD. This allows further reduction in thickness to be achieved.

The projector apparatus of the present invention is a projector apparatus having the illumination optical system described above, so that the projector apparatus can be reduced sufficiently in thickness and size.

BRIEF DESCRIPTION OF DRAWINGS

FIG. 4 is a front view of the illumination optical system illustrated in FIG. 2.

FIG. 5 is a plan view of the illumination optical system illustrated in FIG. 2.

BEST MODE FOR CARRYING OUT THE INVENTION

Figure 1:
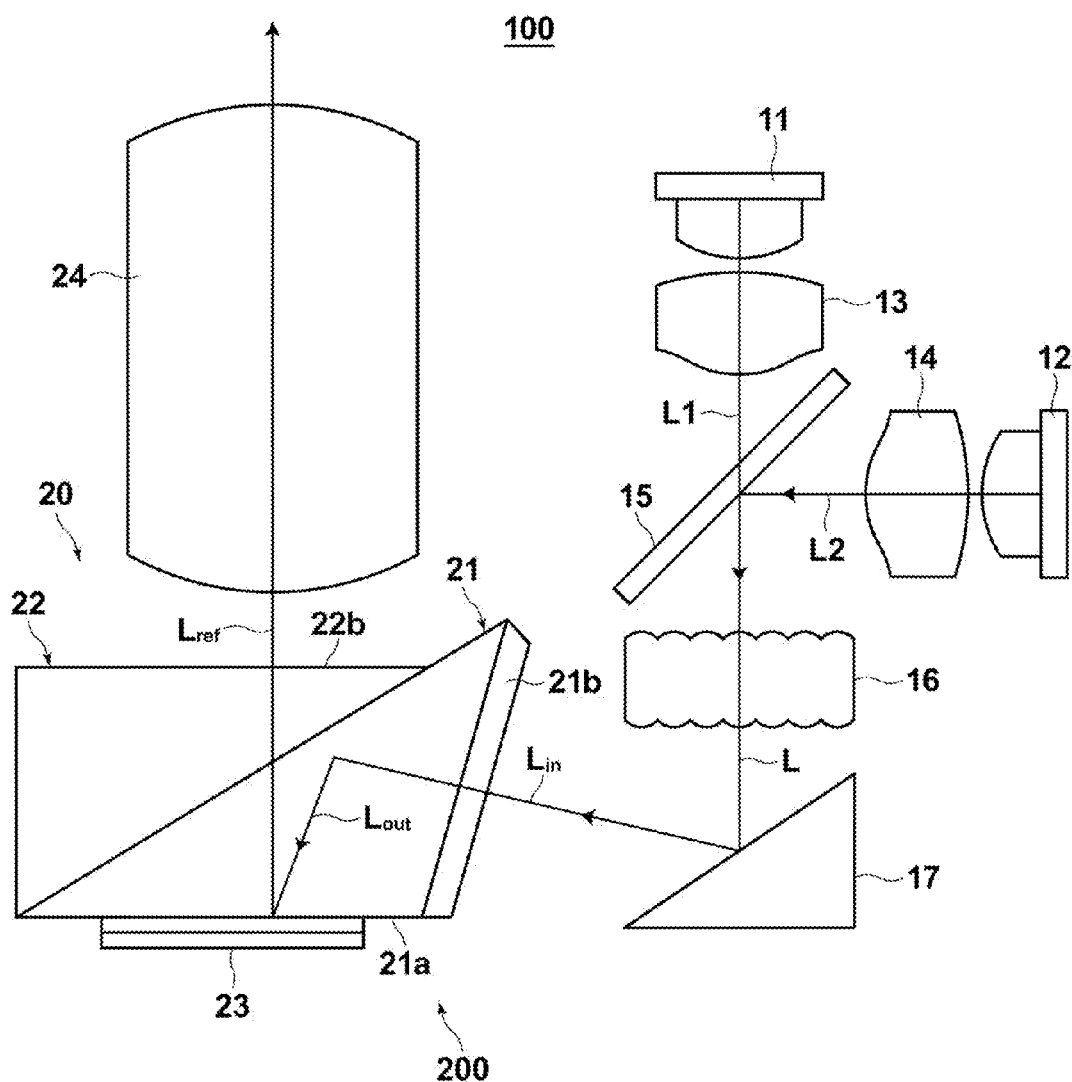
FIG. 1 is a lateral view of a projector apparatus according to an embodiment of the present invention.

Hereinafter, an embodiment of the present invention will be described with reference to the accompanying drawings. FIG. 1 illustrates a projector apparatus 100 according to an embodiment of the present invention. FIGS. 2 to 5 illustrate an illumination optical system 200 used in the projector apparatus 100.

As illustrated in FIG. 1, the projector apparatus 100 includes a first light source 11 and a second light source 12, each having, for example, a LED (Light Emitting Diode) that emits light of different wavelength range, a condenser lens 13 for condensing light L1 emitted from the first light source 11, a condenser lens 14 for condensing light L2 emitted from the second light source 12, a dichroic mirror 15 for reflecting the light L2 and transmitting the light L1 to combine them, a fly's eye lens array 16 for homogenizing the cross-sectional intensity distribution of light beam L which is the combined illumination light, a mirror 17 for reflecting the light beam L transmitted through the fly's eye lens array 16, the illumination optical system 200 according to an embodiment of the present invention, and a projection lens 24 for projecting an image formed by light beam $L_{ref}$ transmitted through the illumination optical system 200 toward a screen, not shown. The formation of the image will be described later.

The illumination optical system 200 will now be described. The illumination optical system 200 further includes a TIR prism (Total Internal Reflection Prism) 20 formed of a first prism 21 and a second prism 22 and a DMD (Digital Micromirror Device) 23 disposed close to the bottom surface 21a of the first prism 21 in addition the condenser lenses 13 and 14, dichroic mirror 15, fly's eye lens array 16, and mirror 17.

The first prism 21 and second prism 22 are disposed such that one end face 21c of the first prism 21 and a face of the second prism 22 opposing the end face 21c face to each other with an air gap therebetween, as will be described later. Note that the entire surface of each of the first prism 21 and second prism 22 is provided with a multi-layer dielectric antireflection film.

FIGS. 2, 3, 4, and 5, illustrating extracted major portion of the illumination optical system 200, show the portion of TIR prism 20 and DMD 23 viewed from the bottom right, upper right, left, and top of FIG. 1 respectively. Note that, in FIGS. 2 to 5, a long side direction and a short side direction of the DMD 23 are designated as X direction and Y direction respectively and a direction orthogonal to X and Y directions is designated as Z direction in order to help understanding mutual relationships.

Figure 2:
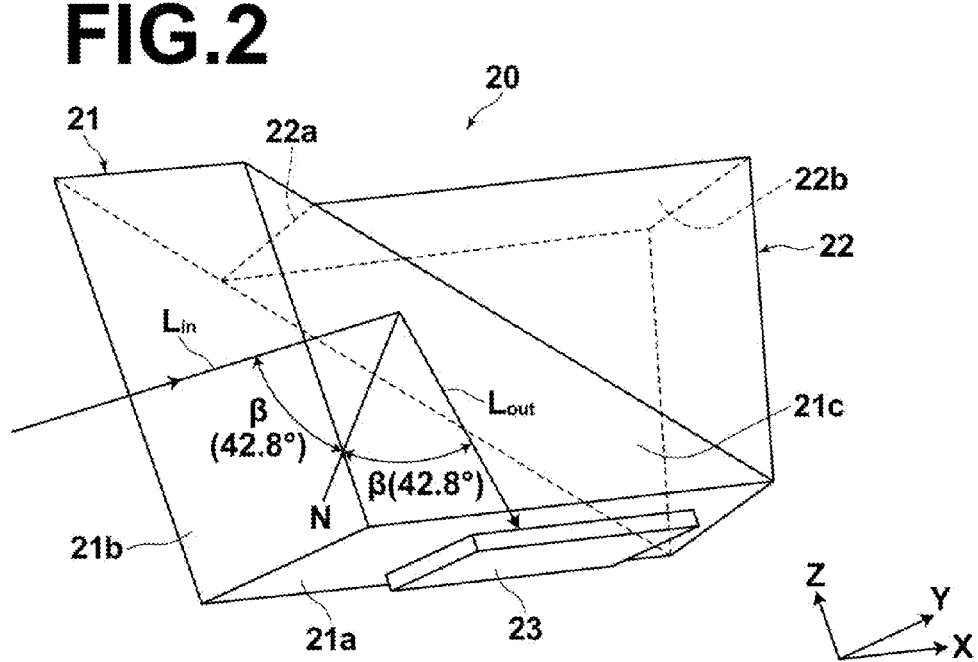
FIG. 2 is a perspective view of an illumination optical system used in the projector apparatus described above.

As clearly illustrated in FIG. 2, the light beam L reflected from the mirror 17 shown in FIG. 1 enters inside of the first prism 21 from the input end face 21b thereof, then totally reflected by the total reflection surface 21c (interface with the second prism 22), exits from the bottom surface 21a of the first prism 21, and is directed to the DMD 23. Note that light beam incident on the total reflection surface 21c, light beam totally reflected by the total reflection surface 21c, and light beam after reflection by the DMD 23 are designated as light beam $L_{in}$, light beam $L_{out}$, and light beam $L_{ref}$ respectively, and they are indicated only by principal rays in the drawing. In FIG. 2, the reference symbol 22a represents an edge of the second prism 22 contacting the first prism 21 and the reference symbol 22b is the upper end face of the second prism 22 through which light beam $L_{ref}$ modulated in a manner to be described later is transmitted.

Figure 10:
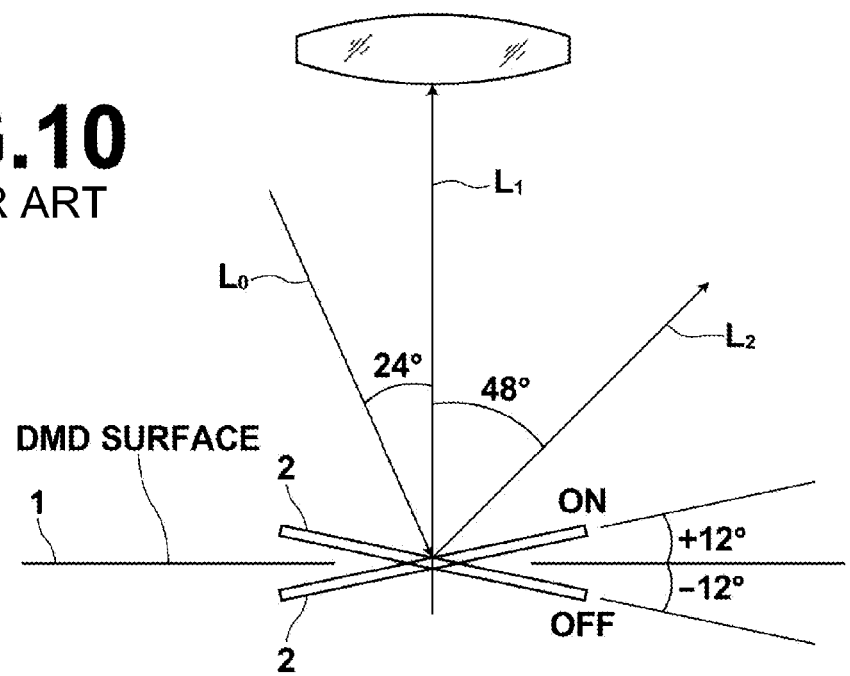
FIG. 10 is a schematic lateral view of a DMD, illustrating a structure thereof.
Figure 11:
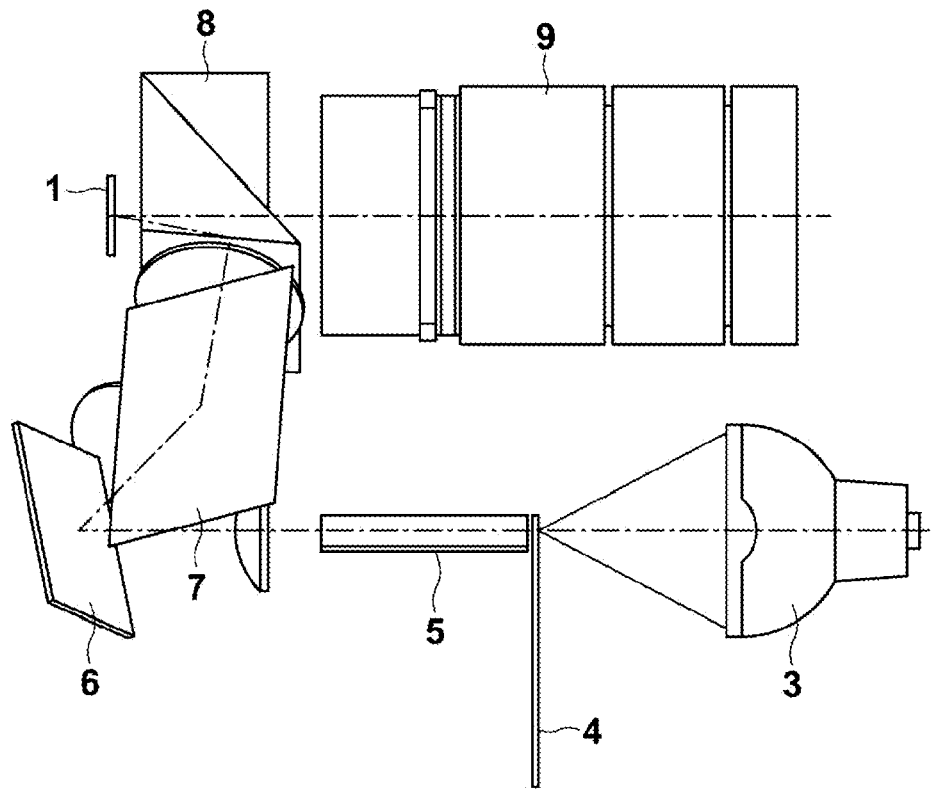
FIG. 11 is a plan view of an example conventional projector apparatus.
Figure 12:
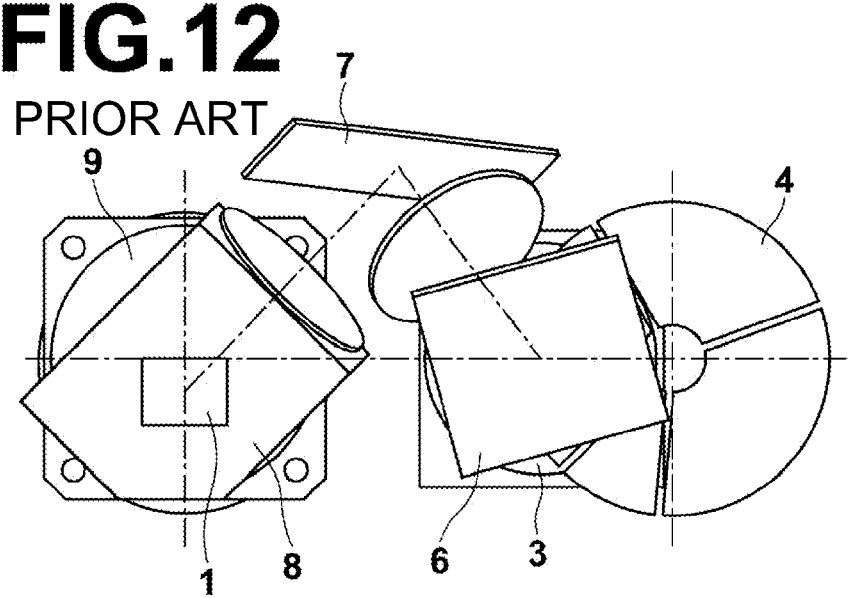
FIG. 12 is a perspective view of the projector apparatus illustrated in FIG. 11.

As described above, the DMD 23 includes a multitude of turnable micromirrors arranged in a matrix which take ON or OFF state based on an image signal, and light beam $L_{ref}$ reflected by the micromirrors and directed toward the projection lens 24 is spatially modulated. Note that the tilt angles of each micromirror of the DMD 23 are set to ±12°, as described above with reference to FIG. 10. In this case, the totally reflected light beam $L_{out}$ forms an angle of 90° with the turning axis R of micromirrors (FIG. 5) and is directed to the DMD 23 from a direction that forms an incident angle of 24° with respect to the surface of the DMD 23 (i.e., a surface parallel to the surface that includes turning axes R of all micromirrors and traverses the surfaces of all the micromirrors).

Then, when the spatially modulated light beam $L_{ref}$ is projected on the screen, a light and dark pattern image with one pixel being represented by one micromirror of the DMD 23 is projected and displayed. As for the image, a tone image may be displayed by controlling the duty ratio of ON state of the micromirrors, as well as a binary image.

Figure 3:
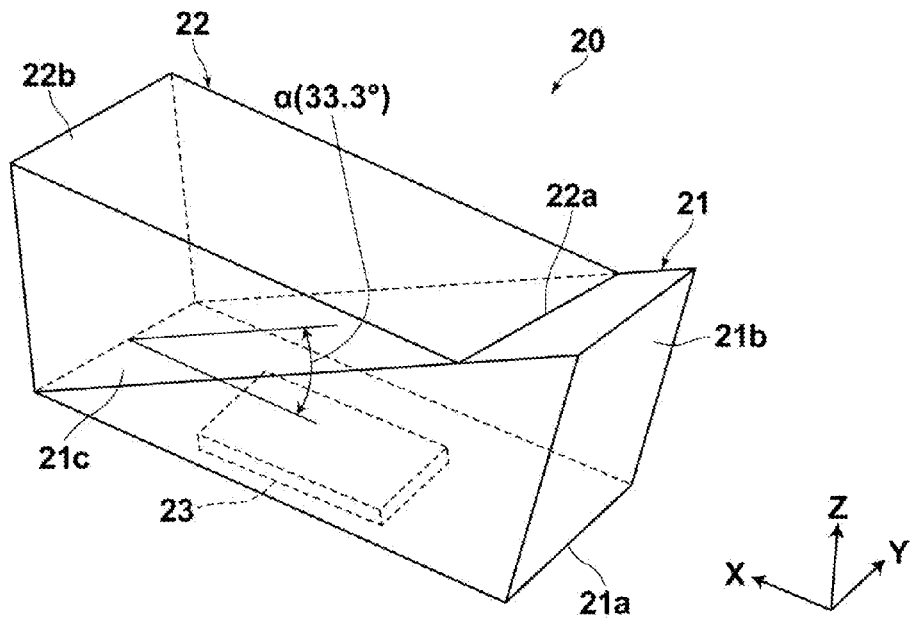
FIG. 3 is a perspective view of the illumination optical system illustrated in FIG. 2 viewed from a different direction.
Figure 6:
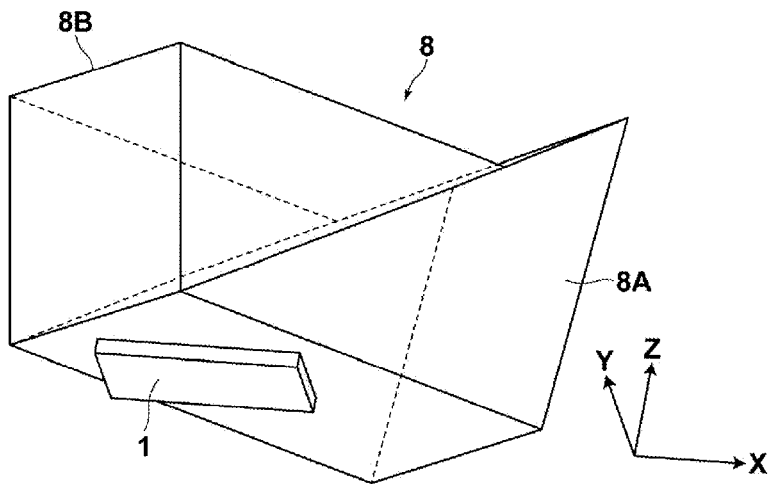
FIG. 6 is a perspective view of an example optical system used in a conventional projector apparatus.
Figure 7:
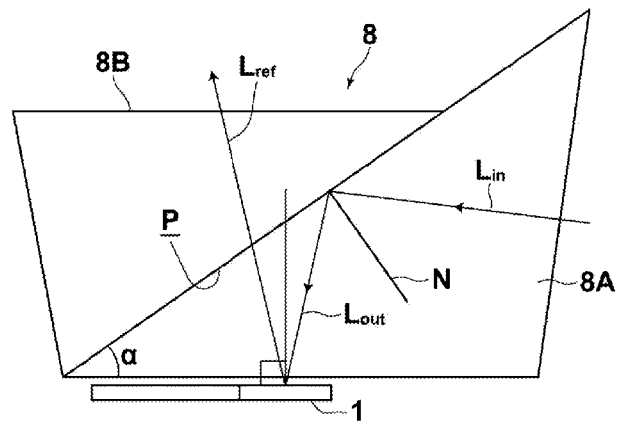
FIG. 7 is a lateral view of the optical system illustrated in FIG. 6.

As illustrated in FIG. 5, the DMD 23 has a rectangular surface and is disposed such that the surface is parallel to the bottom surface 21a of the first prism 21. In the present embodiment, the angle α of the total reflection surface 21c of the first prism 21 with respect to the bottom surface 21a thereof is 33.3°, as illustrated in FIG. 3. By setting the angle α to such a value, incident light $L_{in}$ can be totally reflected by the total reflection surface 21c while the light beam $L_{ref}$ after reflection by the DMD 23 can be transmitted through the total reflection surface 21c.

In the mean time, the incident angle β of the light beam $L_{in}$ incident on the total reflection surface 21c is 42.8° and, therefore, the reflection angle β of the totally reflected light beam $L_{out}$ is also 42.8°, as illustrated in FIG. 2. Here, N is a normal to the total reflection surface 21c at the incident point of the light beam $L_{in}$.

FIG. 5 illustrates the TIR prism 20 viewed from above, i.e., a direction perpendicular to the surface of the DMD 23. As illustrated in FIG. 5, the TIR prism 20 is configured such that a projection line, which is a normal N to the total reflection surface 21c vertically projected on the surface of the DMD 23, forms an angle other than 90° with the micromirror turning axis R of the DMD 23, an exit light projection line, which is a principal ray of light beam $L_{out}$ exits from the total reflection surface 21c vertically projected on the surface of the DMD 23, forms an angle of 90° with the micromirror turning axis R, and an incident light projection line, which is a principal ray of light beam $L_{in}$ incident on the total reflection surface 21c vertically projected on the surface of the DMD 23, is located on the same side as the exit light projection line with respect to a straight line Q passing through an end point of the incident light projection line (that is, incident point on the total reflection surface 21c) and extending parallel to a long side of the DMD 23.

As described above, it is a necessary condition that the exit light projection line, which is a principal ray of light $L_{out}$ exits from the total reflection surface 21c vertically projected on the surface of the DMD 23, forms an angle of 90° with the micromirror turning axis R for normal use of the DMD 23.

Figure 8:
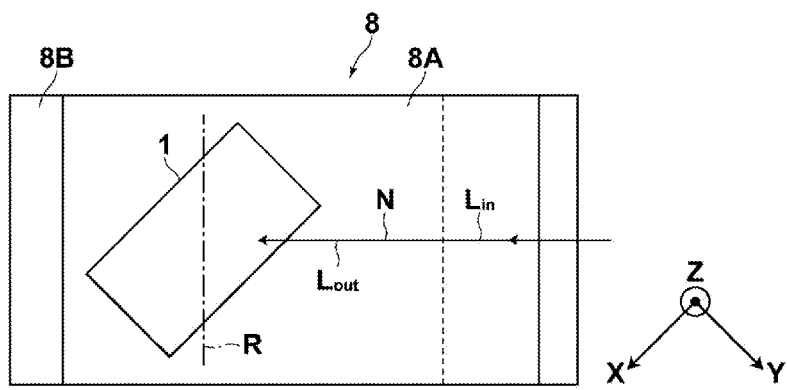
FIG. 8 is a plan view of the optical system illustrated in FIG. 6.
Figure 9:
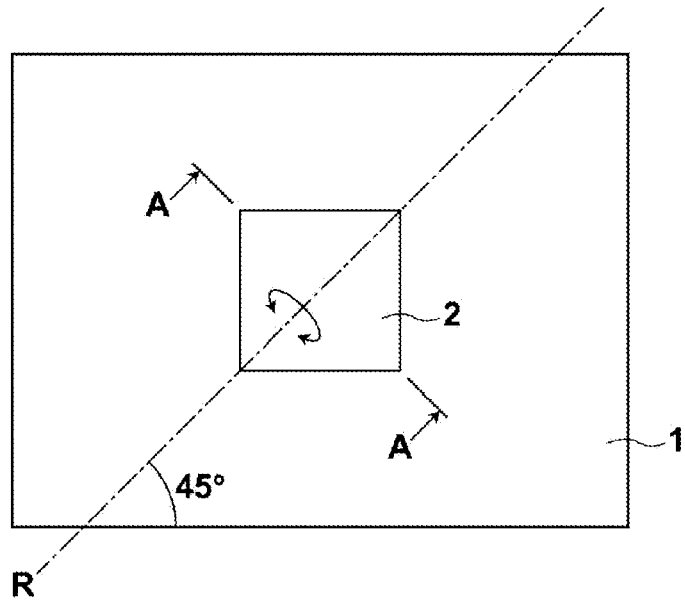
FIG. 9 is a schematic plan view of a DMD, illustrating a structure thereof.

In the mean time, a projection line, which is a normal N to the total reflection surface 21c vertically projected on the surface of the DMD 23, forms an angle other than 90° with the micromirror turning axis R of the DMD 23. This allows the inclination of the TIR prism 20 in the long side direction of the DMD 23 to be reduced, more preferably to be made zero, in comparison with a conventional apparatus, such as the apparatus shown in FIG. 8, configured such that they form an angle of 90°. This, in turn, allows the illumination optical system 200 to be formed thinly by applying a thin prism as the TIR prism 20. If that is the case, also in the projector apparatus 100 shown in FIG. 1, the thickness or size thereof in a direction perpendicular to the plane of FIG. 1 may be reduced, whereby thickness reduction of the projector apparatus is realized.

Further, the TIR prism 20 is configured such that an incident light projection line, which is a principal ray of light beam $L_{in}$ incident on the total reflection surface 21*c* vertically projected on the surface of the DMD 23, is located on the same side as the exit light projection line with respect to a straight line Q passing through an end point of the incident light projection line and extending parallel to a long side of the DMD 23. In comparison with the projector apparatus described in Japanese Unexamined Patent Publication No. 2002-350775 in which the TIR prism is configured such that the incident light projection line is located on a side opposite to that of the exit light projection line with respect to the aforementioned straight line Q, this eliminates the need to take a large width or size in a left-right direction in FIG. 5 for the TIR prism 20, whereby further reduction in thickness may be achieved for the illumination optical system 200.

The present invention is applicable to the case in which the tilt angles of the micromirror are other than ±12°, for example, ±10°. In such a case, the totally reflected light beam $L_{out}$ forms an angle of 90° with the micromirror turning axis R and is directed to the DMD 23 from a direction that forms an incident angle of 20° with respect to the surface of the DMD 23.

What is claimed is:

1. An illumination optical system for use with a projector apparatus in which light emitted from a light source is guided to a TIR prism, light totally reflected by a total reflection surface of the TIR prism is reflected by a DMD having a rectangular surface to perform light modulation, and light transmitted through the total reflection surface after the light modulation is projected on a screen by a projection optical system, wherein:

the DMD is disposed such that the rectangular surface of the DMD is parallel to one end face of the TIR prism from which the totally reflected light exits; and the TIR prism is configured such that a projection line, which is a normal to the total reflection surface vertically projected on the surface of the DMD, forms an angle other than 90° with a micromirror turning axis of the DMD, an exit light projection line, which is a principal ray of light beam exits from the total reflection surface vertically projected on the surface of the DMD, forms an angle of 90° with the micromirror turning axis, and an incident light projection line, which is a principal ray of light beam incident on the total reflection surface vertically projected on the surface of the DMD, is located on the same side as the exit light projection line with respect to a straight line passing through an end point of the incident light projection line and extending parallel to a long side of the DMD.

2. A projector apparatus, comprising the illumination optical system of claim 1.

* * * * *